United States Patent [19]

Roper

[11] 4,381,096
[45] Apr. 26, 1983

[54] SEAT POSITIONER

[75] Inventor: Daniel W. Roper, Rochester, Mich.

[73] Assignee: Rockwell International Corporation, Pittsburgh, Pa.

[21] Appl. No.: 173,487

[22] Filed: Jul. 30, 1980

[51] Int. Cl.³ ............................................. F16M 13/00
[52] U.S. Cl. .................................... 248/429; 108/143; 248/225.4; 248/316 E; 248/411; 308/3 R
[58] Field of Search .................... 248/412, 411, 225.4, 248/429, 316 E; 108/143, 137; 292/305, 342, DIG. 47; 308/3 R

[56] References Cited

U.S. PATENT DOCUMENTS

| 540,531 | 6/1895 | Andren | 248/411 |
| 563,010 | 6/1896 | Bobrick | 248/411 X |
| 598,674 | 2/1898 | Linn | 248/411 |
| 1,956,835 | 5/1934 | Roemer | 308/3 R |
| 2,430,656 | 11/1947 | Wright | 248/429 X |
| 2,548,712 | 4/1951 | Firmin | 308/3 R |
| 3,993,169 | 11/1976 | Baba | 188/67 |
| 4,093,042 | 6/1978 | Pradon | 188/67 |

FOREIGN PATENT DOCUMENTS 3003119 8/1980 Fed. Rep. of Germany ...... 248/411

Primary Examiner—James T. McCall

[57] ABSTRACT

A mechanism is provided for adjusting the relative position of an automotive seat with respect to the floor of the automobile. The mechanism has a first member having a pair of flat converging surfaces of substantial length defining a path of movement between the seat and the floor. At least one locking member is provided and includes a groove having converging side walls complementary with the flat converging surfaces of the first member. The locking member is capable of movement toward and away from the flat converging surfaces of the first member. A spring is provided to bias the locking member toward the flat converging surfaces of the first member thereby wedging the flat converging surfaces of the first member into the groove on the locking element. This prevents relative movement between the seat and the floor. A release mechanism is provided for moving the locking element away from the flat converging surfaces on the first member to permit movement of the components along the path of adjustment.

5 Claims, 3 Drawing Figures

SEAT POSITIONER

BACKGROUND OF THE INVENTION

1. Field of the Invention

The present invention relates to a mechanism permitting infinitely selective positioning of two sliding parts relative to each other such as in connection with adjusting a seat forward and rearward as is used in automobiles.

2. Description of the Prior Art

In a number of applications, a mechanism is desirable for releasably holding two parts relative to each other in a number of different adjusted positions and this is true in particular to the field of automotive seats wherein adjustment of the seat is necessary to allow proper operation of the vehicle by the driver. It has also been found to be desirable to have the adjustment to be infinitely variable so that the seat may be locked in the optimum position.

A typical seat positioner is shown in U.S. Pat. No. 3,893,730, issued July 8, 1975, to Homier et al. This patent discloses a mechanism comprising a pair of elongated members slidably connected for telescopic movement between extended and retracted positions with respect to each other. One of the members carries a friction lock means movable between a locked position on frictional engagement with the other member to frictionally restrain the members in any selected position between the extended and retracted positions and against relative movement with respect to each other and an unlocked position to permit the relative movement of the members. The disadvantages of this type of system are apparent in that while the positioning may be infinitely variable the range over which this positioning may occur is limited to the telescoping feature of the positioner. Furthermore, the mechanism is relatively complicated and expensive to manufacture. The seat positioner of the present invention is able to develop higher locking forces with fewer moving parts and, therefore, is much less expensive to mass produce than the type of seat positioner shown in U.S. Pat. No. 3,893,730.

U.S. Pat. No. 3,793,903, issued Feb. 26, 1974, to Thelman discloses a positioner in which two rollers are moved by the seat adjusting mechanism into contact with a pair of inclined surfaces. Movement forward and rearward is resisted by the frictional forces being developed by one of the rollers being wedged under the inclined surface. To release the seat back, both rollers are displaced so that movement in either direction is possible. As can be seen from FIG. 5, the mechanism is far more complicated than that of the present invention. In addition, the single wedge design does not develop the high locking forces as does the double wedge design of the present invention.

U.S. Pat. No. 1,630,870, issued May 31, 1927, to C. F. Strunck shows the locking device for a display stand in which a single wedge is used to lock the stand at the correct height. While this mechanism is simple, it does not develop sufficient locking forces to withstand the high impact loads required in automotive applications.

U.S. Pat. No. 3,762,241, issued Oct. 2, 1973, to the present inventor discloses a self-energizing clutch which utilizes the double wedge concept employed in the linear seat positioner of the present invention. It has been left to the present invention to set forth a simple and economical design for utilizing this concept in a linear seat adjuster.

Other infinitely adjustable positioning mechanisms can be found in the seat recliner art and specifically U.S. Pat. Nos. 3,237,987; 3,315,298; 3,423,785; 3,508,294 and 4,070,058.

SUMMARY OF THE INVENTION

It is an object of this invention to provide a seat positioning mechanism which provides infinite adjustment over any desired range.

It is another object of this invention to provide a seat positioning mechanism which is composed of relatively few parts and is economical to mass produce.

It is yet another object of this invention to provide a seat positioning mechanism wherein the friction locking means is self-energizing in that it is urged into locking engagement by the very slight movement of the seat in any direction.

It is yet an initial object of this invention to provide a locking mechanism which develops a locking force which is proportional to the magnitude of the force trying to urge the seat forward or rearward.

A seat positioning mechanism according to the present invention includes a first member which has a substantially V-shaped friction surface thereon for a length equal to the desired position adjustment. A second member is provided that has at least one locking element mounted on a camming surface thereon. The locking element has a substantially V-shaped friction surface which has an included angle equal to that of the friction surface on the first member. The camming surface on the second member converges towards the friction surface of the first member whereby movement of the locking element along the camming surface in one direction causes wedging engagement between the friction surfaces on the first and second elements. The wedging engagement between the friction surface on the first element and that on the second element locks the members against relative movement in one direction. Movement of the locking element along the camming surface in the opposite direction causes disengagement of the locking element thereby allowing movement between the members. A spring is provided for biasing the locking element along the camming surface into engagement with the first member. A mechanism is provided for moving the locking element out of engagement with the first member to permit the free movement stated above. These and further features and advantages of the present invention will become more fully apparent from the following detailed description thereof which is to be read with reference to the accompanying drawings.

DESCRIPTION OF THE PREFERRED EMBODIMENT

Figure 3:
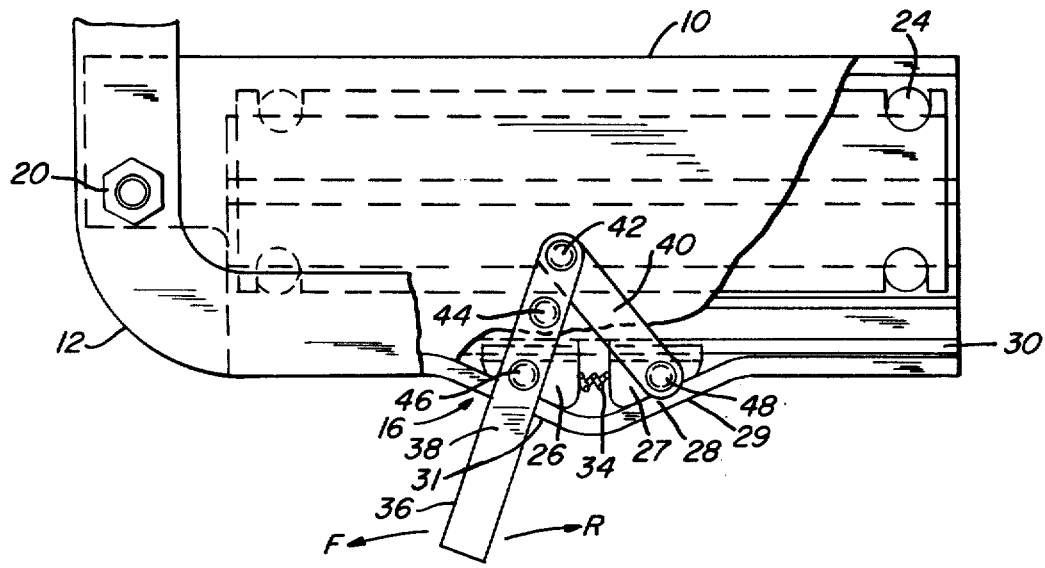
FIG. 3 is a plan view of the seat frame and seat adjuster of FIG. 1.
Figure 1:
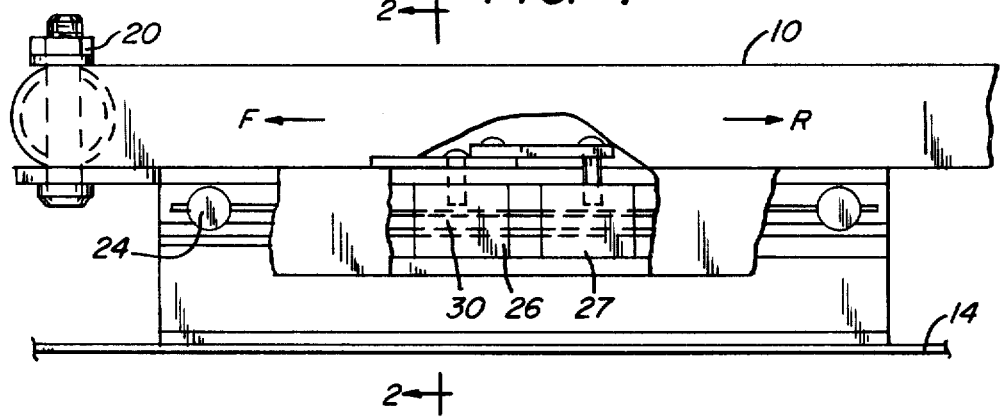
FIG. 1 is an elevational view of a seat frame including the position adjuster of the present invention.
Figure 2:
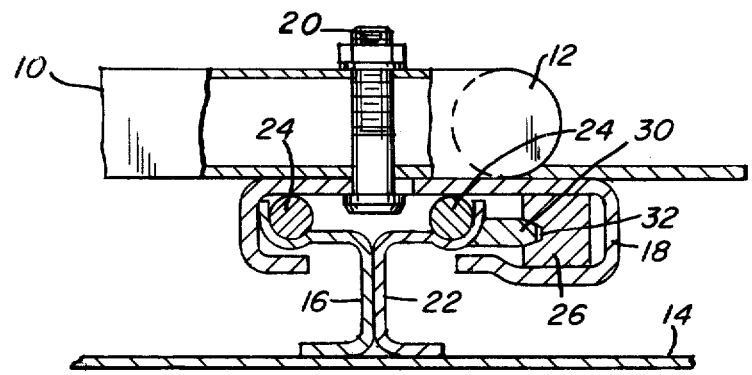
FIG. 2 is a sectional view of the seat frame and position adjuster shown in FIG. 1 along the Lines 2—2.

Referring to FIGS. 1-3, there is shown a seat frame including the positioning mechanism of the present invention. This combination is generally denoted as 10. The seat frame 12 is typical of tubular frames found in automotive applications for attaching seats to floors of automotive vehicles.

In the preferred embodiment, seat frame 12 is rigidly secured to floor 14 of an automotive vehicle (not shown) with the seat adjusting mechanism of the present invention generally denoted as 16 located therebetween. In the preferred embodiment, the seat adjuster 16 includes a locking element housing 18 which is rigidly fastened to the frame 12 through a bolt 20.

The preferred adjuster 16 has a T-shaped structural member 22 which is rigidly attached to the floor 14 of the vehicle. The T-shaped member 22 entraps four ball bearings 24 which facilitate the moving of the locking element housing 18 forward and rearward to adjust the position of the seat frame 12. The locking element housing 18 entraps the locking elements 26 so that the locking elements 26 move forward and rearward along with the movement of the seat frame during adjustment.

In the preferred embodiment, the locking elements 26, 27 are entrapped in a V-shaped camming surface 28 that can be best seen in FIG. 3. The V-shaped camming surface 28 is integral with the locking element housing 18. The locking elements 26 engage a V-shaped friction surface 30 which is rigidly attached to the T-shaped member 22. In the preferred embodiment, the friction surface 30 is formed from one of the walls of the T-shaped member 22.

As can best be seen in FIG. 2, the preferred locking element 26, 27 has a V-shaped groove 32 which has an included angle equal to the included angle on the friction surface 30. The groove 32 is positioned to be capable of engagement with the friction surface 30. The end of the locking element 26 opposite the end with the groove 32 has an angular taper equal to the taper of the V-shaped camming section 28.

As can be seen in FIG. 3, the locking elements 26 and 27 are biased away from one another along camming surface 28 and into engagement with friction surface 30 by a spring 34. The combination of the wedging angles of camming surfaces 28 and the angles of the friction surface 30 and the groove 32 produce a locking effect between the locking element housing 18 and the T-shaped member 22. This locking will be described in greater detail below.

In the preferred embodiment, a release mechanism 36 is provided to move locking elements 26 and 27 toward one another and out of engagement with friction surface 30. The preferred mechanism 36 has a first arm 38 and a second arm 40 connected together by a pivot pin 42. The first arm 38 is pivotally connected to the locking element housing 18 by pin 44. The pin 44 is rigidly secured to the housing 18 and, consequently, the release mechanism 36 moves along with the seat frame 12 as the seat is adjusted. The first arm 38 is pivotally connected to the locking element 26 by pin 46 and the second arm 40 is pivotally connected to the locking element 27 by pin 48. The pins 46 and 48 are rigidly connected to the locking elements 26 and 27 respectively and allow the first and second arms to pivot thereon.

The operation of the locking mechanism of the present invention can best be seen with reference to FIG. 2. The locking element housing 18 which is rigidly attached to the seat cushion frame 12 can slide with the seat frame along the T-shaped member 22. The sliding is facilitated by the four ball bearings 24 which are captured in the T-shaped member. While four ball bearings 24 are provided in the preferred embodiment, it can be seen that additional bearings 24 can be added to facilitate movement between the locking element housing and the T-shaped member. The T-shaped member 22 is fixed to the floor 14 and is oriented in a forward to rearward manner inside the vehicle. The friction surface 30 runs along with the T-shaped member 22 for a predetermined distance equal to the desired range of adjustment of the seat frame 12. The T-shaped member 22 extends the entire forward rearward length of the seat frame 12 plus a distance equal to the predetermined range of adjustment. Thus, the locking element housing 18, which runs the entire forward rearward length of the seat frame 12, will always be in engagement with the T-shaped member 22 whatever position the seat is adjusted to.

To adjust the seat, the occupant would move arm 38 of release mechanism 36 in the direction of R in FIG. 3 thereby moving locking elements 26 and 27 toward one another against biasing spring 34. As the locking elements 26 and 27 move towards one another and down camming surface 28 out of engagement with friction surface 30, the seat may either be moved forward in the direction denoted by F or rearward in the direction denoted by R as desired. Upon release of the arm 38, the spring 34 forces locking elements 26 and 27 up the legs of the V-shaped camming surface 28 and into engagement with the friction surface 30 thereby locking the seat frame 12 with respect to the floor 14.

The locking forces developed by the seat adjustment mechanism of the present design are proportional to the relative forces applied to the locking elements 26 and 27 in the locking element housing 18 and the friction surface 30 mounted on the T-shaped member 22. In other words, the wedging forces between the locking elements 26 and 27 and the friction surface 30 is proportional to the forces trying to move the seat forward or rearward. The forces which tend to move the seat frame 12 in the direction indicated as F in FIG. 3 would create high wedging forces between the friction surface 30 and the locking element 26. These forward forces on the seat 12 would tend to move locking element 26 up leg 31 of the camming surface 28. Since the leg 31 converges toward the friction surface 30, the wedging forces increase as the groove 32 of the locking element 26 is forced into tighter engagement with the friction surface 30. Similarly, forces tending to move the seat frame 12 in the direction R of FIG. 3 would move locking element 26 along leg 29 of the camming surface 28. This again would cause the greater wedging forces to develop. Therefore, it can be seen that each of the locking elements 26 and 27 prevent relative motion between the seat frame 12 and the floor 14 in one direction only.

The relationship between the included angles of groove 32 and friction surface 30, the included angle of the camming surface 28 of locking element housing 18 and the coefficient of friction between the friction surface 30 and the groove 32 on the locking elements must be correctly specified in order to insure that the wedge blocks will be self-energizing. By self-energizing it is meant that the locking elements will move from relatively light contact or engagement with the friction surface 30 of the T-shaped member 22 to tight locking engagement therebetween on slight movement of the seat frame 12 with respect to the floor 14. It has been found that if the locking elements are not self-energizing it would require tight contact between the friction surface 30 and the grooved surface 32 to insure movement of the locking elements 26, 27 along the camming surface 28 upon slight movement of the seat frame 12 with respect to floor 14. Consequently, the forces required to move the locking elements 26, 27 toward one another and out of locking engagement with friction surface 30 of T-shaped member 22 would be too high to permit easy release of the seat adjusting mechanism utilizing the simple release mechanism described above.

If the angle of the V-shaped groove 32 and the angle of the friction surface 30 is called theta and ninety degrees minus one half the included angle of the camming surface 28 on locking element housing 18 is called alpha, then the seat adjusting mechanism will be self-energizing when the following relationship exists:

$$\tan \alpha \cdot (\sin \theta/2) < \mu$$

Where $\mu$ is the coefficient of friction between the V-shaped groove 44 and the friction surface 46 of arm 14. The mechanism will release without binding when the following relationship exists:

$$\tan \alpha > \mu$$

and $$\tan (\theta/2) > \mu$$

If the value of theta is 24 degrees and alpha is 12 degrees, then this device will operate properly over a coefficient of friction range of 0.04 to 0.2. If the material chosen for the friction surface 30 and the groove 32 on locking elements 26 and 27 is steel, then the coefficient of friction range stated above will apply over the life of the mechanism since the coefficient of friction between two steel surfaces falls within the stated range whether it is well lubricated or poorly lubricated. The above angles are chosen so the angle of the taper of the groove 32 will not be a locking angle. Since the only forces acting in the direction to engage the grooved surface is the engaging spring force of spring 34 the release force will never be greater than that spring force if the above relationship exists. This allows easy release of the locking forces using the mechanism 36.

As can be seen from the above description, the infinitely adjustable seat positioning mechanism may be fabricated from stampings with reasonable stresses and tolerances, therefore, could be cheaply mass produced. If the material for the friction surface 30 and the groove 32 other than steel is used, the angles of alpha and theta would vary to maintain the above stated relationship depending upon the coefficient of friction involved.

It will be apparent that the invention herein disclosed is well calculated to achieve the benefits and advantages as hereinabove set forth, it will be appreciated that the invention is susceptible to modification, variation and change without departing from the spirit hereof.

I claim:

1. A mechanism for adjusting the relative position of two components comprising:
    a first member having a pair of flat converging surfaces of substantial length defining a path of movement between said components;
    at least one locking member including a groove having converging side walls complementary with said flat converging surfaces of said first member and movable toward and away from said flat converging surfaces of said first member, means biasing said locking member toward said flat converging surfaces to wedge said flat converging surfaces of said first member into said groove to permit relative movement between said first member and said locking member;
    means for moving said locking element away from said flat converging surfaces to permit movement of said components along said path; and
    said groove having converging side walls complementary with said flat converging surfaces of said first member, there being two locking members, each of said locking members being movable toward and away from said flat converging surfaces of said first member and including a camming surface converging toward said path of movement, the slope of the camming surface of one of said locking members being opposite to the slope of the camming surface of the other said locking member, each of said camming surfaces being movable along a complementary surface converging toward said flat converging surfaces of said first member whereby the relative position of said two components may be adjusted in opposite directions along said path of movement.

2. An adjustable positioner comprising:
    a first member having a substantially V-shaped friction surface for a length equal to the desired position adjustment;
    a second member having at least one locking element mounted on a camming surface thereon, said locking element having a friction surface at one end thereof, said surface on said locking element capable of mating with said friction surface on said first member, said camming surface on said second member converging toward said friction surface on said first member whereby movement of said locking element along said camming surface in one direction causes wedging engagement between friction surface on said locking element and said friction surface on said first member thereby locking said first and second members against relative movement in one direction and movement in the opposite direction causes disengagement of said locking element and said first member;
    means for biasing said locking element along said camming surface into engagement with said first member; and
    means for moving said locking element out of engagement with said first member thereby permitting movement between said first and said second members along said adjustable length, said camming surface on said second member forms an oblique angle with respect to said friction surface on said first member, the included angle of said V-shaped friction surface on said first element is theta and where 90 degrees minus one-half of the included angle of said substantially oblique camming surface of said second member is alpha, where the tangent alpha multiplied by the sine of one-half theta is less than the coefficient of friction between the locking element and said V-shaped edge of said first member, the tangent of alpha is greater than said coefficient of friction and the tangent of one-half theta is also greater than said coefficient of friction.

3. An adjustable positioner as set forth in claim 2 wherein theta is twenty-four degrees, alpha is twelve degrees and the coefficient of friction is in the range of 0.04 to 0.2.

4. An infinitely adjustable positioner for seats which are slidably mounted on tracks to permit forward and back position adjustment, comprising:
 a first member rigidly mounted to said floor;
 a second member rigidly mounted to said seat;
 said second member having a substantially V-shaped tapered edge for a predetermined length;
 said first member having two locking elements mounted on a substantially V-shaped surface thereon, said locking elements having a substantially V-shaped grooved surface at one end thereof, said groove having its sides tapered at an angle equal to that of said tapered edge on said second member;
 said substantially V-shaped surface on said first member oriented with respect to said tapered section on said second member whereby movement of said locking elements along respective legs of said V-shaped surface away from one another causes wedging engagement between said locking elements and said tapered section on said section member, thereby locking said first and said second members against the relative motion and movement of said locking elements towards one another causes disengagement of said locking elements and said tapered surface on said second member;
 means for biasing said locking elements away from one another along said surface into engagement with said second element; and
 means for moving said locking element against said biasing means out of engagement with said second element thereby permitting relative movement between said first and second members.

5. An infinitely variable positioner as set forth in claim 2 wherein said the relationship between the angle of said V-shaped grooved surface and the angle of said substantially V-shaped surface on said first member causes one of said locking elements to move up one leg of said V-shaped surface and into hard locking engagement with said tapered surface of said second member upon slight movement of said second member in the direction of convergence of said one leg and the other of said locking elements to move up the other leg of said V-shaped surface after said locking elements are moved into contact with said tapered surface by said biasing means.

* * * * *